United States Patent
Liptak

(10) Patent No.: US 9,698,723 B2
(45) Date of Patent: Jul. 4, 2017

(54) ROOF ATTACHMENT SYSTEM

(71) Applicant: OMG, Inc., Agawam, MA (US)

(72) Inventor: Andrew J. Liptak, Brighton, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 15/032,457

(22) PCT Filed: Nov. 3, 2014

(86) PCT No.: PCT/US2014/063629
§ 371 (c)(1),
(2) Date: Apr. 27, 2016

(87) PCT Pub. No.: WO2015/066583
PCT Pub. Date: May 7, 2015

(65) Prior Publication Data
US 2016/0268957 A1    Sep. 15, 2016

Related U.S. Application Data

(60) Provisional application No. 61/898,684, filed on Nov. 1, 2013.

(51) Int. Cl.
| | | |
|---|---|---|
| *E04B 5/00* | (2006.01) |
| *H02S 20/23* | (2014.01) |
| *E04D 13/14* | (2006.01) |
| *H02S 30/20* | (2014.01) |
| *E04B 7/18* | (2006.01) |
| *E04D 12/00* | (2006.01) |
| *E04D 13/04* | (2006.01) |

(52) U.S. Cl.
CPC ............... *H02S 20/23* (2014.12); *E04B 7/18* (2013.01); *E04D 12/002* (2013.01); *E04D 13/04* (2013.01); *E04D 13/14* (2013.01); *E04D 13/1407* (2013.01); *H02S 30/20* (2014.12); *Y02B 10/12* (2013.01); *Y02B 10/20* (2013.01)

(58) Field of Classification Search
CPC ......... H02S 20/23; H02S 30/20; E04D 13/04; E04D 13/14; E04D 12/002; E04D 13/1407; E04B 7/18; Y02B 10/20
USPC ........... 52/411, 408, 410; 411/179, 531, 533
See application file for complete search history.

(56) References Cited

U.S. PATENT DOCUMENTS

| | | | | |
|---|---|---|---|---|
| 4,520,606 A | * | 6/1985 | Francovitch | ............ E04D 5/143 411/531 |
| 4,619,094 A | | 10/1986 | Yang | |
| 4,744,187 A | * | 5/1988 | Tripp | ...................... E04D 5/143 411/179 |

(Continued)

OTHER PUBLICATIONS

Search Report.

*Primary Examiner* — Basil Katcheves
(74) *Attorney, Agent, or Firm* — Alix, Yale & Ristas, LLP

(57) ABSTRACT

A roof attachment system has a stud for retaining a fixture to a roof and is mountable to and sealable with a roof. The attachment system includes a base and a retaining stud which projects upwardly from the base. A membrane is disposed over the base. Cooperative upper and lower mount plates include peripheral oppositely projecting teeth which form an intermediate axial gap. A retainer ring is disposed in into the gap and alternately engages against the teeth of the upper and lower mount plates to axially tighten the attachment components to provide a seal.

20 Claims, 4 Drawing Sheets

(56) References Cited

U.S. PATENT DOCUMENTS

| | | | |
|---|---|---|---|
| 5,182,890 A * | 2/1993 | Peters | E04D 5/145 |
| | | | 52/410 |
| 5,803,693 A * | 9/1998 | Choiniere | E04D 5/145 |
| | | | 405/302.1 |
| 6,233,889 B1 * | 5/2001 | Hulsey | E04D 3/3603 |
| | | | 411/533 |
| 8,136,311 B2 | 3/2012 | Liu | |
| 8,166,720 B2 * | 5/2012 | Garrigus | E04D 5/142 |
| | | | 52/408 |
| 8,733,718 B2 * | 5/2014 | Corsi | E04B 1/40 |
| | | | 248/205.1 |
| 2004/0148888 A1 * | 8/2004 | Kuhn | E04D 5/145 |
| | | | 52/410 |
| 2011/0120047 A1 | 5/2011 | Stearns et al. | |
| 2012/0144760 A1 * | 6/2012 | Schaefer | E04C 3/06 |
| | | | 52/58 |
| 2013/0074441 A1 | 3/2013 | Stearns | |

* cited by examiner

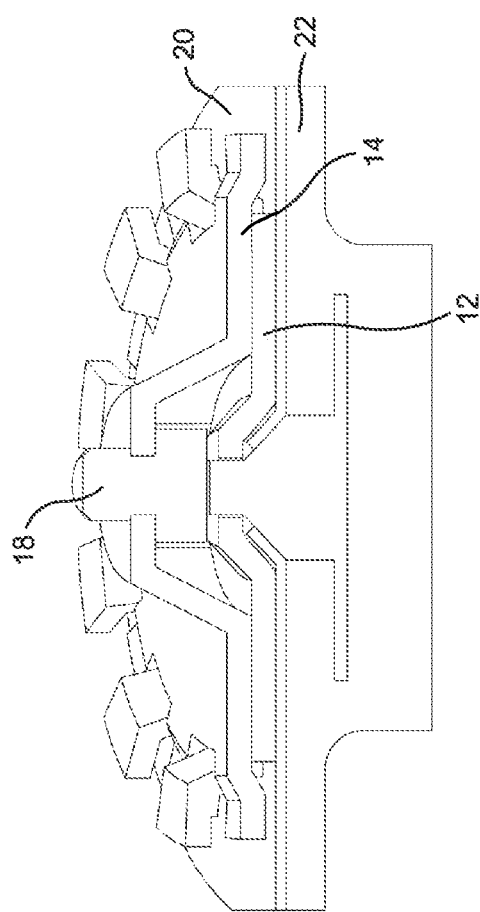
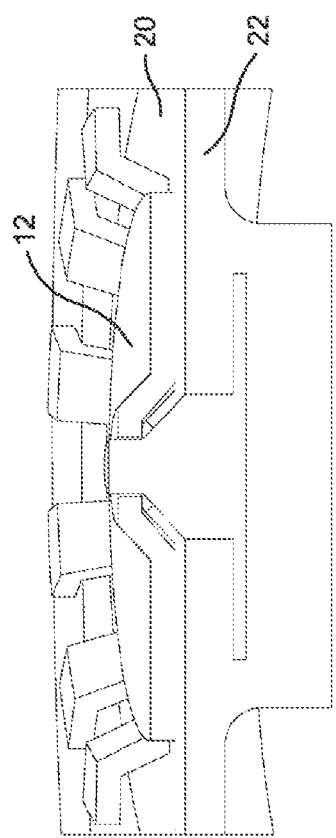
FIG. 2
FIG. 3

ROOF ATTACHMENT SYSTEM

BACKGROUND

This disclosure relates to roofing assemblies, and more particularly, to a roofing assembly for efficiently securing a roofing membrane and mounting and attaching an object to a roof structure, while effectively distributing the object load and maintaining a failsafe fluid seal.

Many fastening systems and components exist for securing a membrane to a roof structure. Most notably, seam plates are disposed at predetermined positions over a fluid sealing roof membrane and attached to the underlying roofing substructure via driving a securing member or heat sealing. Additional systems exist for mounting and attaching objects over the roof/membrane structure. However, known attachment systems are often unsuitable for attachment of heavy objects such as large scale solar panels because the assembly or roof substructure is unable to support the mass of the panels when concentrated over a relatively small area or would require too numerous points of attachment to be feasible in practice. Many known systems increase risk of fluid breaching the building at the point of attachment with the roofing membrane. There is a need for a roof attachment system which effectively distributes weight on a roof over a large area, while maintaining an effective and failsafe seal with a roofing membrane.

SUMMARY

Briefly stated, a roof attachment system in a preferred form comprises a base having an axial retaining stud and defining a plurality of attachment holes. A membrane is disposed over the base. A lower mount plate is disposed over the membrane and coaxial about the stud. The lower mount plate has a plurality of upperwardly and radially outwardly projecting teeth at its periphery. An upper mount plate is disposed over the lower mount plate and is also coaxial about the retaining stud. The upper mount plate has a plurality of downwardly and radially outwardly projecting teeth at its periphery. The upper and lower teeth are spaced so that upon mating, the upper teeth extend below the lower teeth to define a gap. A retaining ring is disposed in the gap and alternately engages the upper and lower teeth to axially tighten the lower mount plate, the upper mount plate, the membrane and the base to provide a fluid tight seal.

The retaining stud is preferably threaded and the lower mount plate and the upper mount plate are threaded to the stud. The retaining ring is split to form adjacent split portions. A connector connects the split portions. The retaining ring is dimensioned and formed of a material which results in a failure rate greater than that of the base, the upper mount plate and the lower mount plate. The retaining ring preferably has a wave-like shape wherein the retaining ring has alternating peaks and valleys.

The base and the retaining stud are integral in one embodiment. The base has a central frustoconical shoulder. At least one of the base, the lower mount plate and the upper mount plate has a plastic composition.

A roof attachment installation comprises a roofing substructure. A base has a central axial retaining stud and is affixed to the roofing substructure. A membrane is disposed over the base and the roofing substructure. A lower mount plate is disposed over the membrane and coaxial about the stud. The lower mount plate has a plurality of upwardly and radially outwardly projecting teeth. An upper mount plate is disposed over the lower mount plate and coaxial about the stud. The upper mount plate has a plurality of downwardly and radially outwardly projecting teeth. The upper and lower teeth are spaced so that upon mating, the upper teeth axially extend below the lower teeth to define a gap. A retaining ring is disposed in the gap and alternately engages the upper and lower teeth to axially tighten the lower mount plate, the upper mount plate, the membrane and the base to provide a fluid tight seal.

The base and the retaining stud are preferably integral. The base defines a plurality of holes. Fasteners extend through the holes to affix the base to the roofing substructure. The retaining ring is a wave-like structure comprising alternating peaks and valleys. The retaining ring is preferably split to form adjacent split end portions. A connector connects the split end portions.

The base, the lower mount plate, the upper mount plate and the retaining ring preferably have a plastic composition. The retaining stud in one embodiment has a threaded portion. The upper mount plate and the lower mount plate each have a central threaded opening which threadably engages the retaining stud. The retaining ring is dimensioned and is formed of a material which results of a failure rate greater than that of the base, the upper mount plate and the lower mount plate. The base further may have a central frustoconical shoulder adjacent a lower portion of the retaining stud.

BRIEF DESCRIPTION OF THE DRAWINGS

FIG. 2 is a sectional view of the attachment assembly of FIG. 1;

FIG. 3 is a sectional view of the disclosed attachment system with the mount assembly partially assembled;

DETAILED DESCRIPTION

Figure 1:
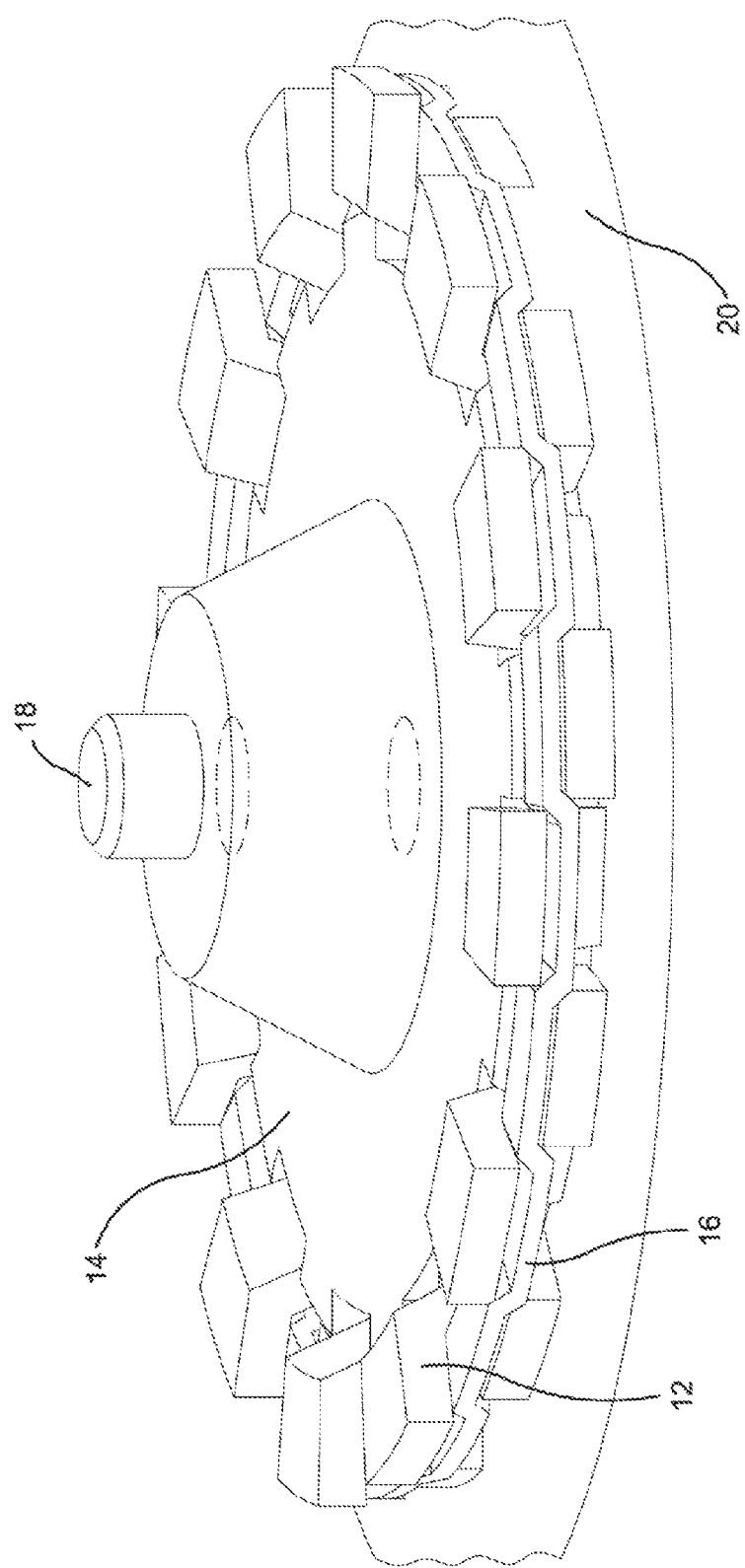
FIG. 1 is a perspective view of a roof attachment system.

With reference to the drawings wherein the following numerals represent like parts throughout the several figures, an attachment system for load distribution and failsafe sealing on a roofing structure is generally designated by the numeral 10.

The disclosed system includes a wide base 22, which may be formed of plastic or another relatively lightweight, strong and rigid material. The retaining stud or bolt 18 is molded into the plastic base, although other known techniques for attachment may be employed. The retaining stud 18 functions as a principal support and attachment structure for an object to be mounted to the roof.

As shown, the base 22 includes numerous attachment holes 24 and preferably extends over a large area. A preferred embodiment includes a base 22 with a diameter of approximately 14 inches, although the particular diameter is clearly non-limiting. The base 22 may be attached to a roofing substructure by driving securing members (i.e., nails or screws) through the holes. The holes 24 are disposed at predetermined positions so as to align with the crest portions of a standard corrugated roof substructure. Usually a substrate (i.e., insulation) is positioned between the base 22 and the substructure.

Once a base 22 or numerous bases are secured on the roofing structure, the fluid sealing membrane 20 may be laid over the base. With reference to FIG. 2, a lower mount plate 12 is positioned over the membrane 20, thereby cooperating with the base 22 and mount stud 18 to pinch the membrane 20. As depicted, the lower mount plate 12 has a generally circular cross section with a central opening and a plurality of upward and radially outwardly projecting teeth 13 spaced along its periphery.

An upper mount plate 14 substantially mates with the lower plate 12. The upper plate 14 has also has a generally circular cross section and a central opening and includes a plurality of downward and radially outwardly projecting teeth 15 spaced along its periphery. The respective teeth 13 and 15 of the upper and lower plates are spaced to allow the upper plate teeth to extend axially below the lower plate teeth with an axial gap 17 therebetween when the upper and lower plates are mated (shown best in FIG. 2). The central openings of the plates may be threaded. The upward and downward extensions of the teeth 13 and 15 are preferably at an angle to the central axis.

In one embodiment, the outer surface of the mounting stud 18 is threaded and the upper and lower mount plates 12 and 14 are secured via threaded mating with the stud 18. The respective plates 12 and 14 are coaxial about the stud 18.

Figure 4:
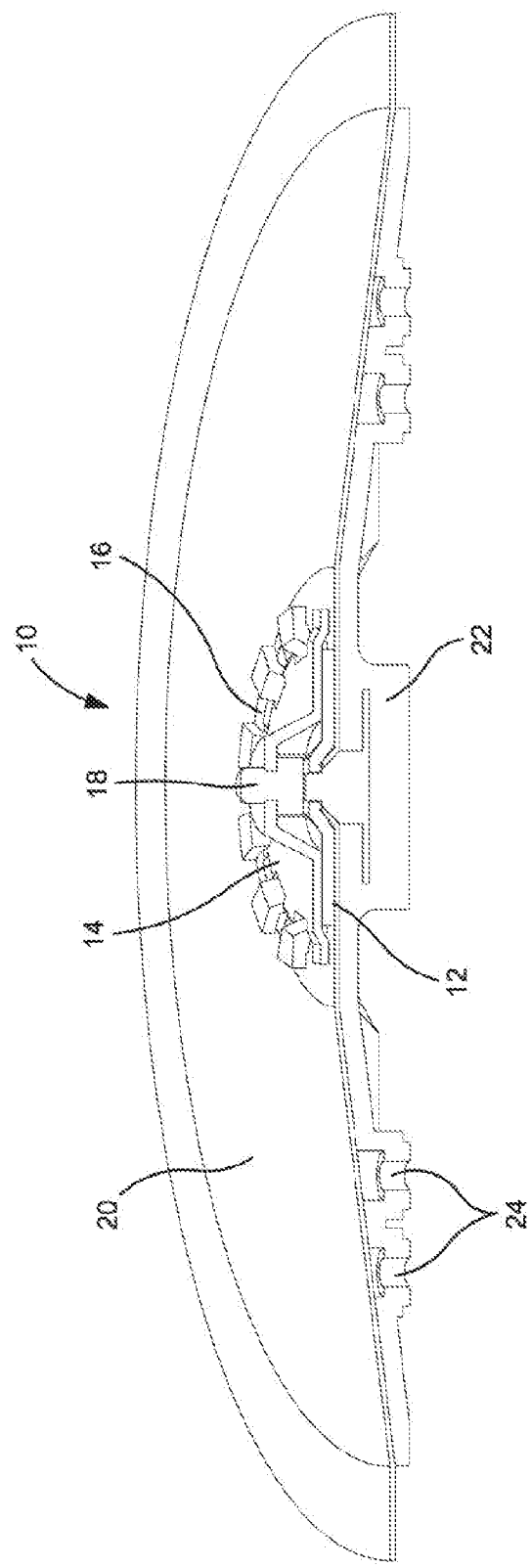
FIG. 4 is a sectional view of the disclosed attachment system.
Figure 5:
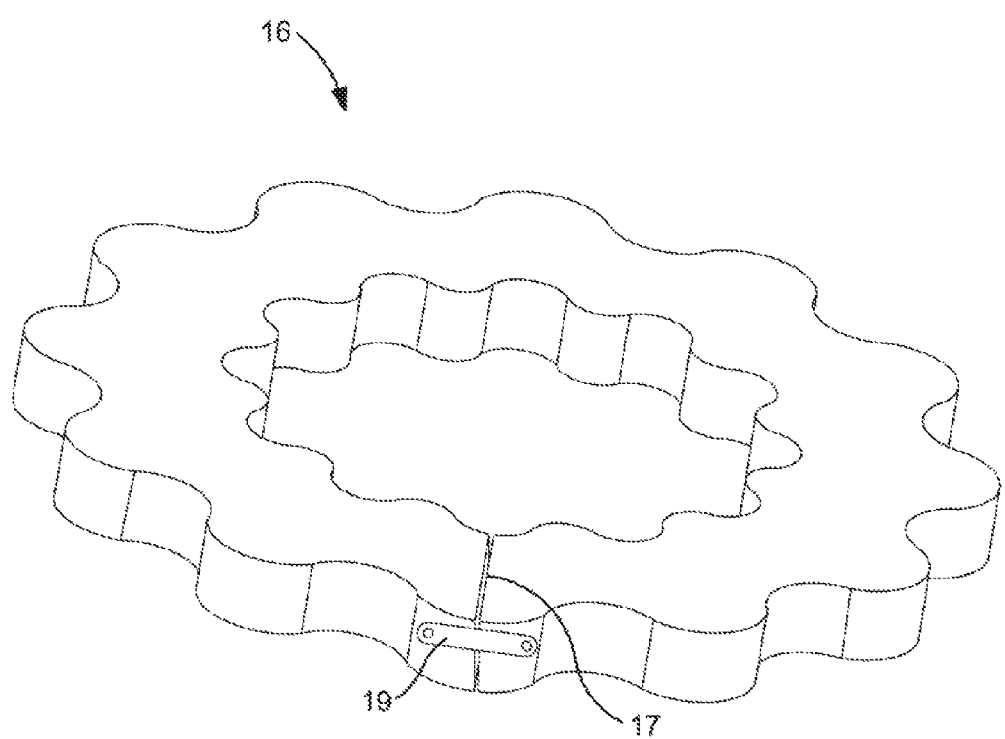
FIG. 5 is an enlarged perspective view of a retainer ring that may be employed in the roof attachment system.

With reference to FIGS. 4 and 5, a retaining ring 16 is positioned axially between the upper plate teeth 15 and the lower plate teeth 13. As shown in FIG. 5, the retaining ring 16 may have a modified wave formation with peaks and valleys which aid in engaging with the teeth. The retaining ring typically has a split 17 to allow engagement around the mount plates. One embodiment includes a locking mechanism, such as a clip 19, at end portions adjacent the split to allow the ring 16 to be locked after attachment. Once engaged between the teeth and locked, the retaining ring 16 may be rotated over the approximate radius of a single tooth so that the crests or peaks align with the lower plate teeth (which extend axially upward) and the valleys align with the upper plate teeth (which extend axially downward). Rotation of the retaining ring 16 in this manner tightens the axial abutment between each element, thereby forming a strong fluid seal within the attachment system.

As shown, the installed attachment system includes four separate fluid tight sealed interfaces: upper plate/stud shoulder; lower plate/stud; upper plate/lower plate surface; and lower plate/membrane surface. Preferably, the retaining ring 16 is formed of a material and thickness having strength to be the engineered first failure point of the system. Thus, if the ring fails, the numerous sealing interfaces remain unharmed until a new retaining ring 16 can be installed, thereby preserving the integrity of the seal of the roof structure. Additionally, the disclosed system provides a fluid seal without requiring welding or similar attachment of the membrane and without utilization of multiple membranes.

In addition to the large base 22 distributing a downward force from the attached object and/or snow, attachment of the base to the roofing substructure in this fashion helps distributes uplift force (from wind or the like) over numerous crests in the roofing substructure. The mount stud may be configured with a bolt or like unit which can be reciprocated axially therealong to adjust the height of the attached structure.

The base 22 is typically manufactured from a material such as plastic to reduce manufacturing cost, but this material is in no way limiting of the system.

The lower mount plate 12, upper mount plate 14 and retaining ring 16 may also have a plastic composition. Several base/mount units may be installed as described above for supporting large heavy items, such as high powered solar panels. When installed on the attachment system, the force from the large mass of the solar panels is distributed over the entire area of the large base 22, rather than concentrated centrally near the stud as would be the case with related known mounting units. This is an important consideration in that the integrity and effectiveness of roofing insulation substrates may be compromised if compressed.

In sum, the disclosed system attachment 10 increases the number of attachment points to the roofing substructure (and thus the holding power of the unit to the roofing substructure) and the footprint to distribute mass and resulting downward force on the roof substrate. For example, an installation of four 3 foot by 5.5 foot solar panels connected to each other via hinged attachment on adjacent edges in an "accordion style" can be attached and maintained in a pitched configuration on a roof using nine spaced attachment systems like those disclosed herein, the preferred diameter of a base being approximately 14 inches.

While preferred embodiments of the foregoing roof attachment system have been set forth for purposes of illustration, the foregoing description should not be deemed a limitation of the invention herein. Accordingly, various modification adaptations and alternatives may occur to one skilled in the art without departing from the spirit and scope of the present invention.

The invention claimed is:

1. A roof attachment system comprising:
   a base having an axial retaining stud and defining a plurality of attachment holes;
   a membrane disposed over the base;
   a lower mount plate disposed over the membrane and coaxial about the stud and having a plurality of upwardly and outwardly projecting teeth at its periphery;
   an upper mount plate disposed over the lower mount plate and coaxial about the stud and having a plurality of downwardly and outwardly projecting teeth at its periphery, said outwardly projecting upper teeth and outwardly projecting lower teeth being spaced so that upon mating, the upper teeth axially extend below the lower teeth to define a gap;
   a retaining ring disposed in said gap and alternately engaging said upper and lower teeth to axially tighten said lower mount plate, said upper mount plate, said membrane and said base to provide a fluid tight seal.

2. The attachment ring of claim 1 wherein said retaining stud is threaded and said lower mount plate and said upper mount plate are threaded to said seal.

3. The roof attachment system of claim 1 wherein said retaining ring is split to form adjacent split portions.

4. The roof attachment system of claim 3 wherein said retaining ring has a connector connecting said split portions.

5. The roof attachment system of claim 1 wherein said retaining ring is dimensioned and formed of a material which results in a failure rate greater than that of the base, the upper mount plate and the lower mount plate.

6. The roof attachment system of claim 1 wherein said retaining ring has a wave-like shape with alternating peaks and valleys.

7. The roof attachment system of claim 1 wherein said base and retaining stud are integral.

8. The roof attachment system of claim 1 wherein said base has a central frusto conical shoulder.

9. The roof attachment system of claim 1 wherein at least one of said base, said lower mount plate and said upper mount plate has a plastic composition.

10. A roof attachment installation comprising:
a roofing substructure;
a base having a central axial retaining stud and affixed to said roofing substructure;
a membrane disposed over the base and roofing substructure;
a lower mount plate disposed over the membrane and coaxial about the stud and having a plurality of upwardly and radially outwardly projecting teeth at its periphery;
an upper mount plate disposed above the lower mount plate and coaxial about the stud and having a plurality of downwardly and radially outwardly projecting teeth at its periphery, said outwardly projecting upper teeth and outwardly projecting lower teeth being spaced so that upon mating, the upper teeth axially extend below the lower teeth to define a gap; and
a retaining ring disposed in said gap and alternately engaging said upper and lower teeth to axially tighten said lower mount plate, said upper mount plate, said membrane and said base to provide a fluid tight seal.

11. The roof attachment installation of claim 10 wherein said base and said retaining stud are integral and said base defines a plurality of holes.

12. The roof attachment installation of claim 11 further comprising fasteners extending through said holes to affix said base to said roofing substructure.

13. The roof attachment installation of claim 10 wherein said retaining ring is a wave-like structure comprising alternating peaks and valleys.

14. The roof attachment installation of claim 10 wherein said retaining ring is split to form adjacent split end portions.

15. The roof attachment installation of claim 14 further comprising a connector which connects said split end portions.

16. The roof attachment installation of claim 10 wherein said base, said lower mount plate, said upper mount plate and said retaining ring have a plastic composition.

17. The roof attachment installation of claim 10 wherein said retaining stud has a threaded portion.

18. The roof attachment installation of claim 17 wherein said upper mount plate and said lower mount plate each have a central threaded opening, which threadably engages said retaining stud.

19. The roof attachment installation of claim 10 wherein said retaining ring is formed of a material which results in a failure rate greater than that of the base, the upper mount plate and the lower mount plate.

20. The roof attachment installation of claim 10 wherein said base further comprises a central frustoconical shoulder adjacent a portion of said retaining stud.

* * * * *